United States Patent [19]

Brescia et al.

[11] Patent Number: 4,502,054

[45] Date of Patent: Feb. 26, 1985

[54] SELECTIVE INK-JET PRINTING DEVICE

[75] Inventors: Riccardo Brescia, Ivrea; Mario Buat, Carema; Giandomenico Dagna; Alessandro Scardovi, both of Ivrea, all of Italy

[73] Assignee: Ing. C. Olivetti & C., S.p.A., Ivrea, Italy

[21] Appl. No.: 392,664

[22] Filed: Jun. 28, 1982

[30] Foreign Application Priority Data

Jul. 10, 1981 [IT] Italy .............................. 67959 A/81

[51] Int. Cl.[3] .............................................. G01D 15/18

[52] U.S. Cl. .................................. 346/75; 346/140 R

[58] Field of Search ............ 346/140 PD, 106, 139 R, 346/1.1, 75; 400/637.6; 106/20

[56] References Cited

U.S. PATENT DOCUMENTS

| | | | |
|---|---|---|---|
| 2,978,088 | 4/1961 | Pearson et al. | 400/637.6 |
| 3,705,043 | 12/1972 | Zabiac | 106/20 |
| 3,974,508 | 8/1976 | Blumenthal | 346/140 PD |
| 4,333,086 | 6/1982 | Ebi | 346/140 PD |
| 4,343,012 | 8/1982 | Knapp | 346/139 R |
| 4,359,744 | 11/1982 | Salmre | 346/1.1 |
| 4,364,054 | 12/1982 | Kelly | 346/1.1 |
| 4,403,234 | 9/1983 | Miura et al. | 346/140 PD |
| 4,432,003 | 2/1984 | Barbero et al. | 346/140 R |

OTHER PUBLICATIONS

European Search Report EP 82 30 3265.

*Primary Examiner*—A. D. Pellinen
*Assistant Examiner*—Todd E. DeBoer

[57] ABSTRACT

The device comprises a printing head (15) constituted by an insulating container (19) with a capillary nozzle (36). The electrically conductive ink is kept under circulation in the container via a feed tube (26, 23) and a return tube (27, 24) leading to a suction pump, in order to allow the formation of a convex meniscus at the exit aperture of the nozzle (36) and eliminate any vapor bubbles. A pulse generator creates a voltage of a predetermined value and duration between an electrode (37) external to the nozzle and an electrode (23) in contact with the ink, in order to create a state of excitation of the meniscus and partial vaporization of a layer of ink, such as to expel a plurality of ink particles. The head is mounted on a carriage movable transversely to the paper, which advances at each stroke reversal of the head.

37 Claims, 18 Drawing Figures

SELECTIVE INK-JET PRINTING DEVICE

BACKGROUND OF THE INVENTION

This invention relates to an ink-jet printing device, in which printing is carried out by inducing the selective emission of particles of an electrically conductive liquid ink through a nozzle from a container.

Various types of printers are known in which a selective ink-jet is produced by pressure pulses induced piezoelectrically, or by electric pulses inducing electrostatic ejection of droplets. These printers are generally very complicated and costly because of problems in the rapid drying of the droplets. It has therefore been sought to produce emission of the ink in other ways in order to ensure good penetration of the ink and quick drying.

In a known device (U.S. Pat. No. 2,143,376), the ink is contained in a conductive vessel of frusto-conical shape, of which the minor base, disposed upwards, is open for emission of the ink. The device comprises a point electrode which is disposed above the paper and is excited so as to cause the ink particles to be electrostatically attracted towards the electrode. This attraction is said to be favoured by a state of agitation of the surface of the liquid, and by its vaporisation caused by any electrical discharges created between the electrode and container. This method has various drawbacks, both because it is difficult to keep the ink at the level of the opening without marking the paper, and because of the difficulty producing consistent electrical discharges and the damage caused by them to the paper.

A printing device has also been proposed in which the ink is kept at a predetermined level in a tube having its opening facing upwards. Two electrodes are inserted into the tube so that they are disposed in the same horizontal plane, and remain immersed under a predetermined depth of ink. Ink emission is produced by instantaneous vaporisation of a portion of ink inside the nozzle at the level of the electrodes, so as to hurl the overlying layer of ink against the paper. In particular, in a modification of this device (U.S. Pat. No. 3,177,800) the ink is electrically nonconductive, and instantaneous vaporisation is produced by a breakdown in the dielectric properties of the ink, this inducing a spark between the electrodes.

In a further modification of the device comprising two electrodes immersed in the ink (U.S. Pat. No. 3,179,042), the ink is electrically conductive with a high electrical resistance, and is preheated to a temperature slightly lower than its boiling point. On exciting the two electrodes by means of a voltage pulse, current passes through the ink to produce instantaneous heat which vaporises a portion of ink, so expelling the overlying ink.

Both these modifications of the device with two immersed electrodes have the drawback of requiring a tube of considerable diameter to house the electrodes, so that it is not possible to obtain dots which are sufficiently small for a high definition printer.

A printing device has also been proposed (FR No. 2 092 577) in which the tube has a horizontal axis, and is connected to the bottom of a container of electrically non-conductive ink. Coaxially to the tube there is disposed an electrode in the form of a pointed needle, while into the free end of the tube there is inserted a metal sleeve which reduces the tube diameter and forms the second electrode. Because of its pressure, the ink normally fills the electrode, so that both the electrodes are immersed. On exciting the two electrodes, a spark is struck in the liquid between the two electrodes due to breakdown of the dielectric, and causes instantaneous vaporisation of parts of the ink between the electrodes, with the expulsion through the sleeve of the ink contained therein.

This device has the drawback that because of the ink pressure, particularly after relatively long intervals of inactivity, the ink tends to leak from the sleeve, whereas the spark passing through the ink causes undesirable physical-chemical transformations.

Finally, a printing device has been proposed (GB No. 2 007 162) in which in order to emit an ink droplet from a nozzle, an ink vapour bubble is created inside a nozzle by means of an electrothermal transducer disposed outside the nozzle. This device generates a large quantity of heat which has to be quickly eliminated in order to ensure repeatability of the phenomenon. In addition, only one droplet is generated each time, so that it has the same drawbacks as devices in which the ink jet is generated by piezoelectric or electrostatic means.

The object of the present invention is to provide a selective ink-jet printing device which prevents deterioration of the ink, and which ensures the printing of indelible marks which are immediately dried.

This problem is solved by the printing device according to the invention, which is characterised in that the container is insulating, the ink is kept under such a pressure such as to form a concave meniscus in the nozzle, and the printing of a dot is carried out by a voltage pulse between a first electrode which is in contact with the ink in the contaniner and a second electrode which is disposed outside the nozzle, so as to create excitation of the meniscus and an electric current in the ink in the nozzle which cause the expulsion of a spray constituted by a plurality of ink particles.

BRIEF DESCRIPTION OF THE DRAWINGS

The invention will be described in more detail, by way of example, with reference to the accompanying drawings, in which:

FIG. 3*a* is a diagramatic detail of FIG. 1 similar to FIG. 3, but showing a modified embodiment;

DESCRIPTION OF THE PREFERRED EMBODIMENTS

Figure 1:
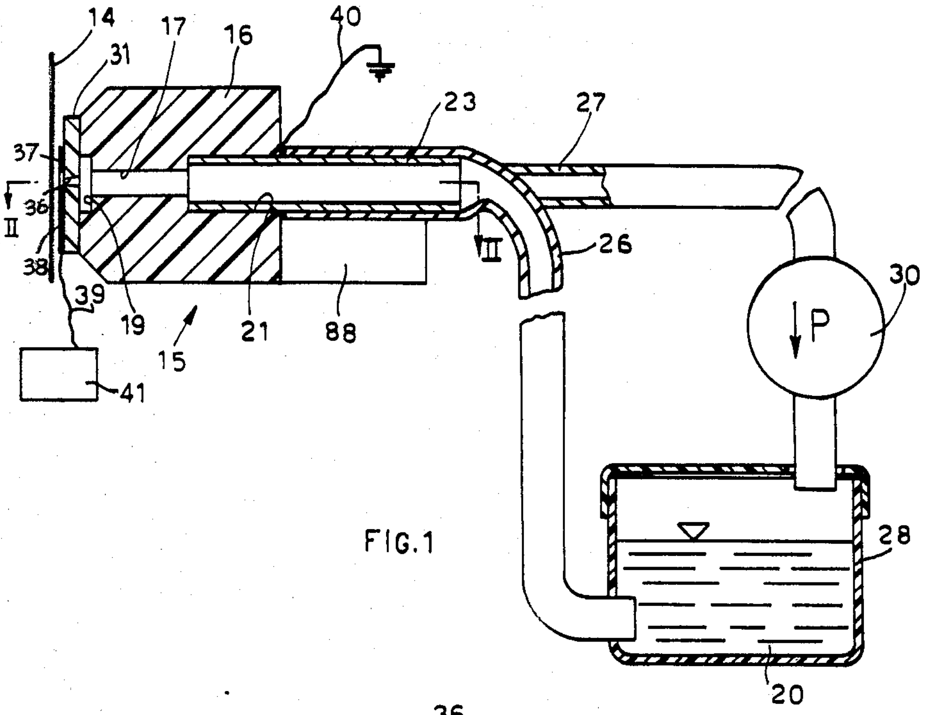
FIG. 1 is a longitudinal section through a selective ink-jet printing head according to the invention.

In FIG. 1, an ink-jet printing head 15 is disposed in front of a print support, for example a sheet of paper 14. The head 15 is constituted by a block 16 of insulating material, for example a polycarbonate or polyphenylene oxide resin, in which there are provided two parallel, laterally spaced ducts or bores 17 and 18 (FIGS. 2 and 4) disposed in the same horizontal plane. The two bores 17 and 18 open into an oblong compartment 19 which constitutes a small capacity container for the ink 20.

At their rear, the two bores 17 and 18 have counter-bores 21 and 22 into which two metal tubes 23 and 24 having an inner diameter not less than that of the bores 17 and 18 are fixed, being for example cemented or heat fused. The tubes 23 and 24 are of stainless steel or other metal resistant to corrosion by the ink 20 and by the galvanic action of the current in the ink.

Two flexible tubes 26 and 27, also of insulating material and having an inner diameter of about one half that of the bores 17 and 18, are forced over the tubes 23 and 24. The tube 26 is connected to a vessel 28 in which there is disposed a quantity of ink 20 much greater than that which can be held in the container 19. The conduit 26 always dips into the ink 20 in the vessel 28. The conduit 27 is connected to a suction pump 30 which returns in indrawn ink into the vessel 28, above the ink level, so as to ensure a head for the pump 30 independent of the ink level. Consequently the ink is circulated through the container 19, the ink entering through the bore 17 and leaving through the bore 18.

Figure 3:
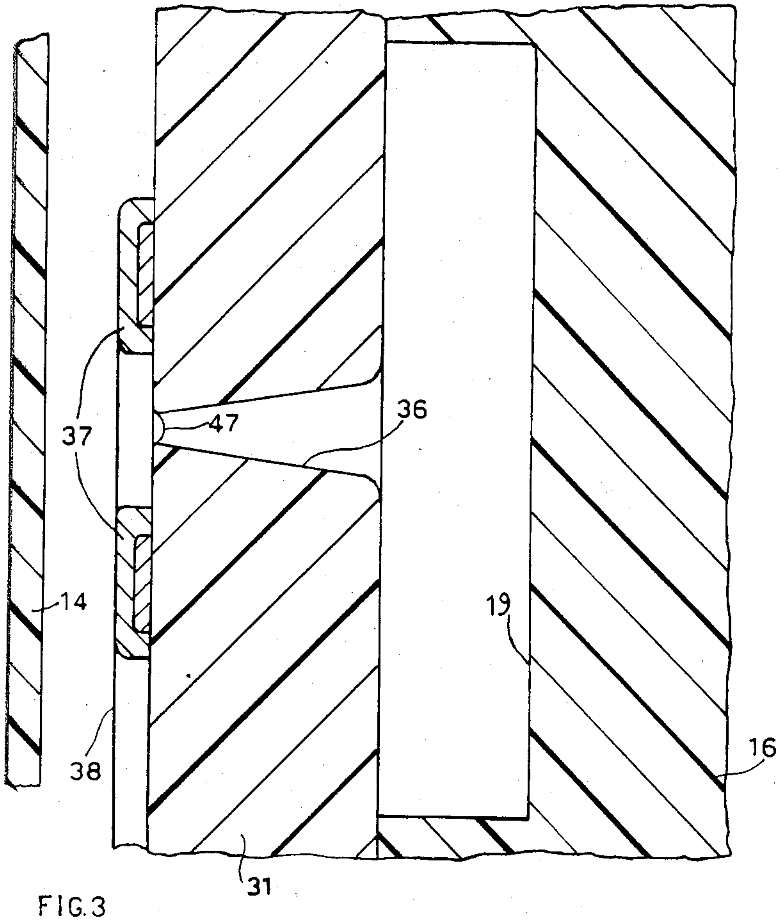
FIGS. 3, 3*a* is a diagrammatic detail of FIG. 1 to a very enlarged scale, in which some dimensions have been altered for illustrative purposes.

The container 19 is closed by a plate 31 which is fused on to the block 16 and has a thickness of the same order of magnitude as the depth of the container 19. In the centre of the plate 31 there is provided a nozzle 36 constituted by a capillary bore of very small diameter, for example a few hundredths of a millimeter, so as to ensure capillary effects on the ink 20. The nozzle 36 can have a shape which is either cylindrical or slightly convergent, for example conical (FIG. 3).

By way of example, the plate 31 may be an insulating layer of alumina or other refractory or vitreous ceramic material. The thickness of the plate 31 is about 0.6 mm, while the depth of the container 19 is of the same order of magnitude as the thickness of the plate 31, for example about 0.4 mm. The nozzle 36 can be made by boring the plate 31 before fixing it on the block 16, using a laser beam directed on to that surface which is to remain inside the head 15, so that the nozzle 36 becomes substantially conical in shape from the inside outwards. In a specific example, the diameter of the outer aperture of the nozzle 36 is about 35μ (micron), while the diameter of the inner aperture is about 120μ. However, the exit diameter of the nozzle can vary from 20 to 100μ according to the fluidity of the chosen ink and the required size of the dot to be printed by the ink. Likewise, the thickness of the plate 31, and thus the length of the nozzle 36, can vary from a minimum of 0.2 mm to a maximum of 1 mm, while the depth of the container 19 can be greater than that indication up to a maximum of double the length of the nozzle 36. The sections normal to the depth of the container have a linear dimension up to two orders of magnitude relative to the depth.

The small depth of the container creates a considerable velocity and throughput gradient from the walls towards the centre, so facilitating the removal of any bubbles as will be seen hereinafter. In the embodiment shown on the drawings, the two ducts 17 and 18 are disposed so that they emerge from the container 19 in the same horizontal plane, and are equidistant from the nozzle 36 (see also FIG. 4).

Figure 2:
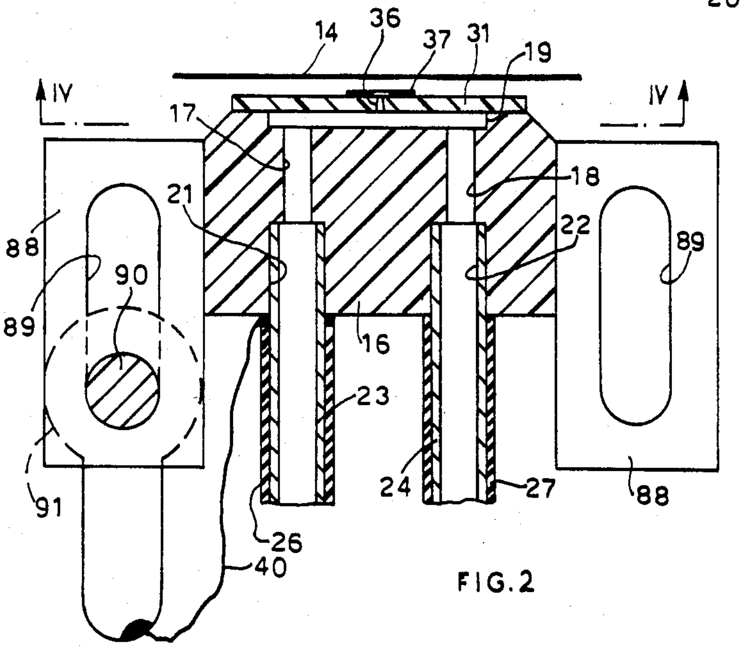
FIG. 2 is a section on the line II—II of FIG. 1.
Figure 3A:
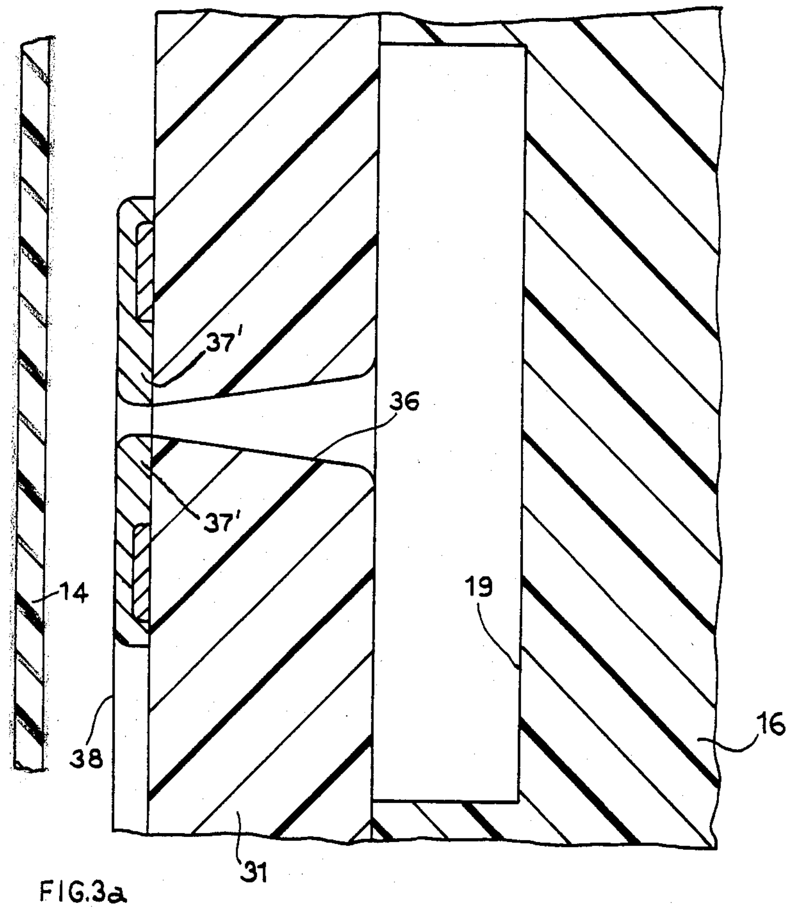

A circular electrode 37 concentric with the nozzle 36 is deposited on the plate 31 by the silk-screen method. The circular electrode 37 is formed from a layer of erosion-resistant metal such as nickel grown galvanically, and a layer of non-oxidisable conducting metal of high melting point such as platinum. The thickness of the electrode 37 is of the order of 50μ, while its inner diameter can vary from a minimum equal to the outer diameter of the nozzle 36 (as indicated at 37′ in FIG. 3*a*) to a maximum of 1 mm. By way of example, in the head of FIGS. 1 to 4, a diameter of 0.4 mm has been chosen in order to provide a relatively large free surface towards the nozzle 36, to supply the energy required for the jet and obtain good wear resistance. Finally, the outer surface of the plate 31 is disposed at a distance from the paper 14 of between 0.1 and 2 mm. Preferably, this distance is kept at 0.2 mm (FIGS. 1 and 2).

The electrode 37 has a downwardly extending tongue 38, which is connected by a conductor 39 to the positive pole of a pulse generator 41. A second conductor 40 is soldered at one end to the metal tube 23 and is connected at the other end to earth, so that the tube 23 constitutes a second electrode in contact with the ink 20.

The ink 20 is constituted by a solution of dyes in an electrically conducting liquid carrier having a relatively low specific resistance. In order to reduce the specific resistance, 1–3% of a saline electrolyte can be added to the solution. The electrolyte can consist of a chloride or sulphate of lithium, magnesium or potassium. The dye can be of acid, solvent or direct type in a quantity of 2.5–6%. This dye can consist of a nigrosine supplied by the firm Bayer. In particular, it has been found experimentally that excellent results are obtained if the specific resistance of the ink lies between 20 and 300 ohms.cm and if its surface tension is at least 30 dynes/cm, and preferably between 40 and 70 dynes/cm. The kinematic viscosity of the ink should be low, preferably between 1 and 1.5 centistokes, in order to facilitate circulation of the ink 20 through the tubes 23, 24, 26 and 27, to facilitate its penetration into the nozzle 36 and to reduce the energy necessary for generating the printing jet.

One example of an ink having the aforesaid characteristics which was used in the experiments has the following composition:

nigrosine: 2.5–6%
diethyl glycol: 1–10%
lithium chloride: 1–3%
water: to 100%

During printing, the pump 30 is kept in operation in order to keep the ink 20 circulating through the container 19. The pressure in the container is slightly negative, for example by an amount between 0.005 and 0.05 kg/cm$^2$, but not so low as to prevent the ink 20 from invading the nozzle 36 by capillarity. The ink 20 then forms a concave meniscus 42 (FIG. 3) substantially in line with the exit aperture of the nozzle 36.

On activating the pulse generator 41 (FIG. 1), it generates at the electrode 37 a voltage pulse, described in greater detail hereinafter, thus supplying a quantity of energy indicated by the area beneath the curve W in FIG. 5, in which the ordinate indicates the power values in kW. This voltage causes a sudden increase in the ionisation of the space lying between the electrode 37 and the meniscus 42 which is at the same potential as the electrode 23, so causing a passage of electric current of ionic type. Moreover, because of residues 43 (FIG. 6*a*) of the ink 30 between the electrode 37 and the edge of the nozzle 36, the voltage induces a current of resistive type in the ink 20. The bombardment of the ions against the meniscus 42 induces a state of agitation in this latter, with numerous microwaves 44 (FIG. 6*b*) which favour the passage of resistive current. If the resistive current is too weak because of the state of the space between the nozzle 36 and electrode 37, it can happen that the voltage of the nozzle 36 reaches the break-down value for the dielectric constituted by the air, so that a spark is produced, i.e. a discharge of positive ions between the electrode 37 and meniscus 42 which considerably increases the mechanical state of agitation of the meniscus 42, so leading to the separation of particles 45 (FIG. 6*b*).

Both the ionic and resistive current penetrating through the meniscus 42 into the mass of ink 20 give rise to a purely resistive resultant current, of which the density is a maximum in that section of the nozzle 36 of smallest diameter. The intensity of the resultant $I^2R$ heat is also a maximum in this position, and consequently an instantaneous vaporisation of a layer 46 (FIG. 6*b*) of ink 20 is induced in this restricted section, leading to a large increase in pressure. The ink of the microwaves 44 and of the particles 45 which have separated by the effect of the agitation of the meniscus 42, and part of the ink of the portion 46, then form a crown 47 (FIG. 6*c*) which increases in volume as shown at 47', to further atomise the ink particles to form a spray 48 (FIG. 6*d*), which will be called the first ink spray. The vaporisation of the layer 46 increases the resistance in the nozzle, so that the current through the electrode 37 ceases substantially as soon as the spray 48 separates from the nozzle 36. The ink particles then proceed exclusively by the effect of the inertia and the pressure generated locally by the vaporisation. This spray 48 is hurled towards the paper 14 at a high speed of the order of 40–50 m/sec.

Figure 5:
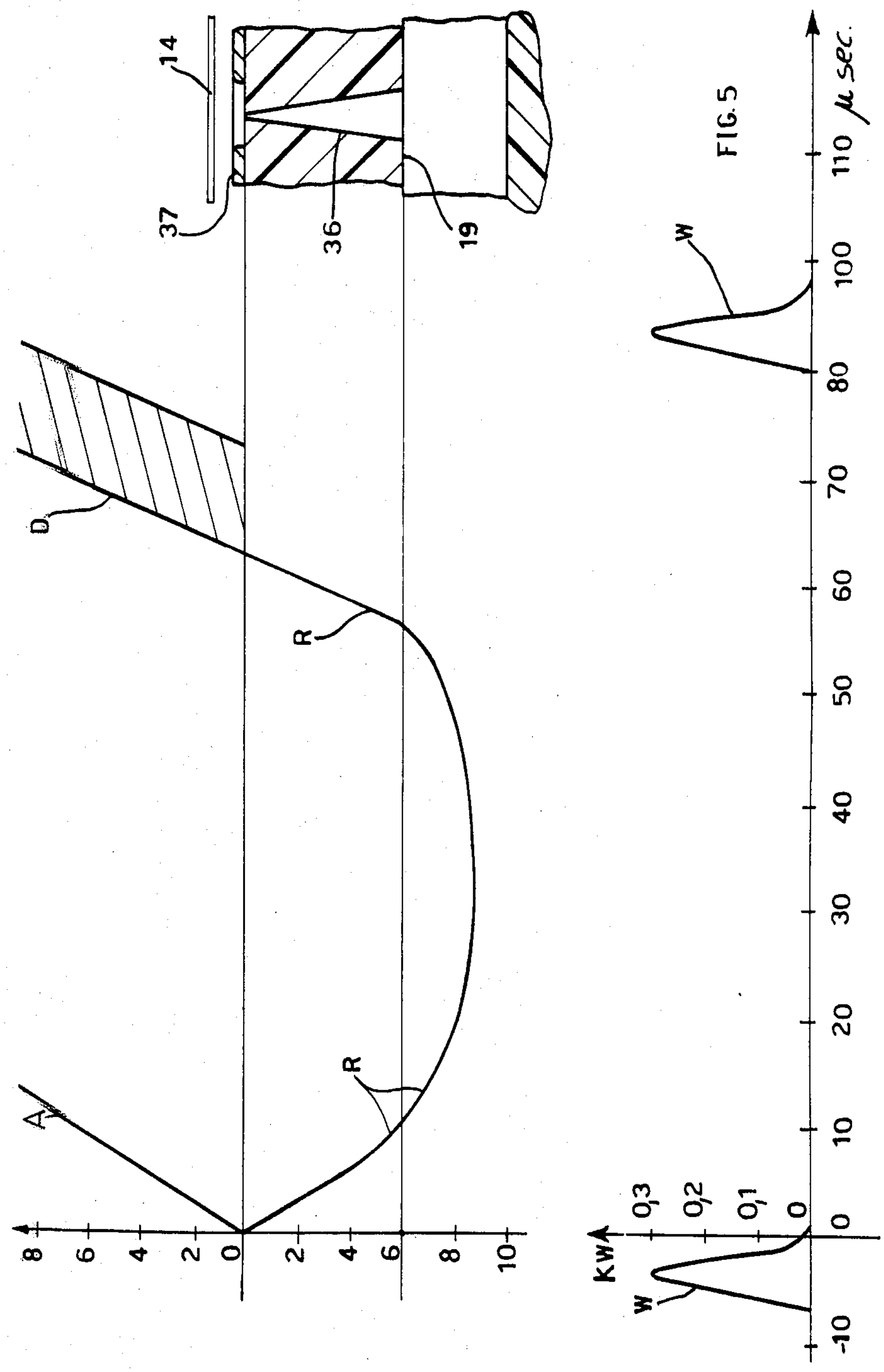
FIG. 5 is a diagram showing the operation of the printing head.
Figures 6A, 6B, 6C, 6D, 6E, 6F:
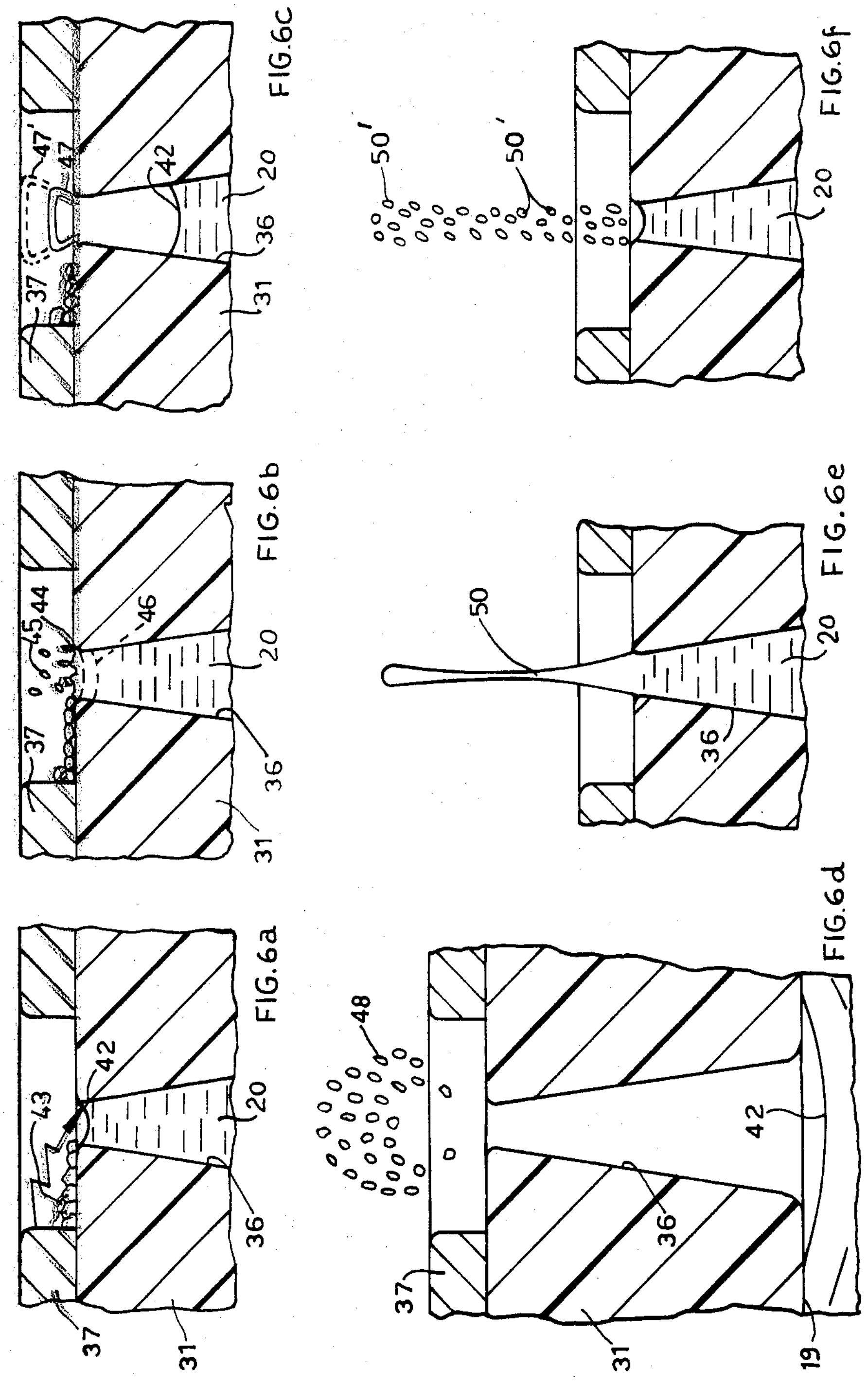
FIGS. 6*a* to 6*f* show diagrammatically certain stages in the emission of the ink from the head.

In FIG. 5, curve A indicates the movement of the ink particles in tenths of a millimeter as a function of time starting from their emergence from the exit aperture of the nozzle 36, this being indicated on the ordinate axis at 0 on the diagram. The time in μsec is indicated starting from the beginning of the spray, as the duration of the power pulse W can vary. For comparison purposes, FIG. 5 shows the nozzle 36 and the paper 14 on the same scale as the ordinate axis, from which it can be seen that the spray 48 (FIG. 6*d*) reaches the paper 14 before having excessively widened out, to deposit on the paper a rose pattern of ink particles, which print a dot having a diameter of between 0.1 and 0.3 mm.

Figure 4:
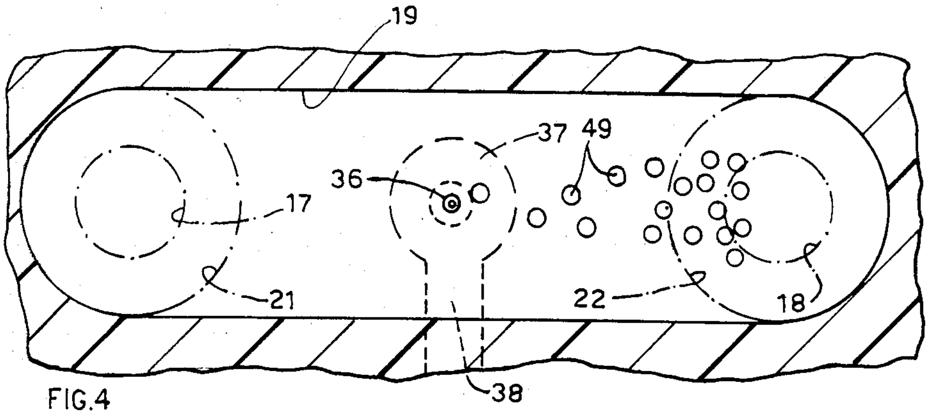
FIG. 4 is a section to an enlarged scale on the line IV—IV of FIG. 2.

Simultaneously, the sudden vaporisation of the layer 46 (FIG. 6*b*) of ink causes a withdrawal of the meniscus 42, indicated by the curve R of FIG. 5, and which at its lowest point is substantially of the same order as the length of the nozzle 36, so that gas bubbles 49 (FIG. 4) of a diameter of 0.1–0.2 mm are created where the nozzle 36 joins on to the container 19, and these must be evacuated. This is done by circulating the ink 20 by the pump 30, so that the bubbles 49 become concentrated towards the discharge bore 18 as shown in FIG. 4. It has been found experimentally that a throughput of the pump 30 of the order of 1 $cm^3$ per minute is sufficient for the timely evacuation of the bubbles 49 and to maintain the aforesaid negative pressure at the nozzle 36.

The pressure wave caused by the vaporisation of the ink layer 46 is propagated through the ink 20 in the container 19 and reflected back to push the meniscus 42 towards the outside of the nozzle 36 at a continually increasing speed (the rising part of the line R in FIG. 5). After a delay which is of the order of 60–80 μsec but is largely influenced by the shape and dimensions of the container 19, a second spray 50 (FIG. 6*e*) of ink 20 leaves the nozzle 36 in the form of a dart at a speed of the order of 50–100 m/sec., i.e. greater than that of the first spray 48. The movement of this dart is represented by the curve D in FIG. 5. The ink particles 50' (FIG. 6*f*) which are formed by the dart 50 now move along approximately parallel trajectories, so that, assuming the paper 14 to be at rest, a second set of particles 50' becomes deposited in the central zone of the printed dot to make the dot more uniform and improve penetration of the ink 20 into the paper 14. The dart 50 emerges for a few microseconds, as indicated in FIG. 5 by the hatched zone to the right of curve D.

Obviously, if the head 15 moves with continuous motion during printing, the dart 50 strikes the rows of ink particles of the dot deposited by the first spray 48 in a position offset from the centre. However, the speeds are such that this position is still within the area of the dot, so that no appreciable smear occurs. After the separation of the dart 50 from the nozzle 36, the meniscus 42 returns to its initial position of FIG. 6*a*.

In order to obtain exact repeatability of the phenomenon, the next pulse generated by the pulse generator 41 should not be generated before the dart 50 separates from the nozzle 36, so that the optimum printing frequency should not exceed the maximum frequency at which there is no overlapping of the curves R in FIG. 5. This frequency is of the order of 1300 Hz with the experimented head 15. In practice, a slight overlap of the successive curves R does not produce appreciable effects on the printed dots, as the only effect is that part of the dart 50 becomes involved in the next excitation of the electrode 37, so that the printing frequency can even exceed the said value.

A first control circuit 41 for the printing head 15 will now be described in detail with reference to FIG. 7. For this purpose, the electrical circuit of the head 15 can be represented by a resistor 101 and a capacitor 102 connected in parallel with each other between the two conductors 39 and 40 of the head 15. The control circuit comprises a step-up transformer 103, of which the primary 104 is connected to an energy source 106 and to a driver circuit 107. The secondary 108 of the transformer 103 is connected to the conductors 39 and 40 and has its own parasitic capacitance 109, the effect of which will be seen hereinafter. The energy source 106 is supplied by a positive voltage, for example 50 V, charging a shunt capacitor 110 in order to provide a high instantaneous current intensity. The driver circuit 107 comprises a logic signal amplifier 111 connected to the base of a power tranistor 112 in parallel with a diode 113, which enables the excess energy to be returned to the power unit.

Figure 7:
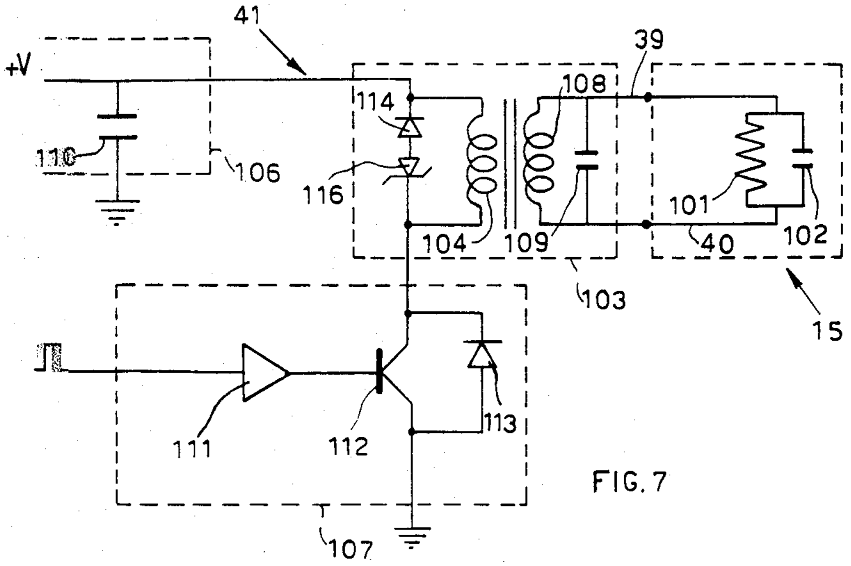
FIG. 7 is an electrical circuit diagram of a first embodiment of the control circuit for the head.
Figure 8:
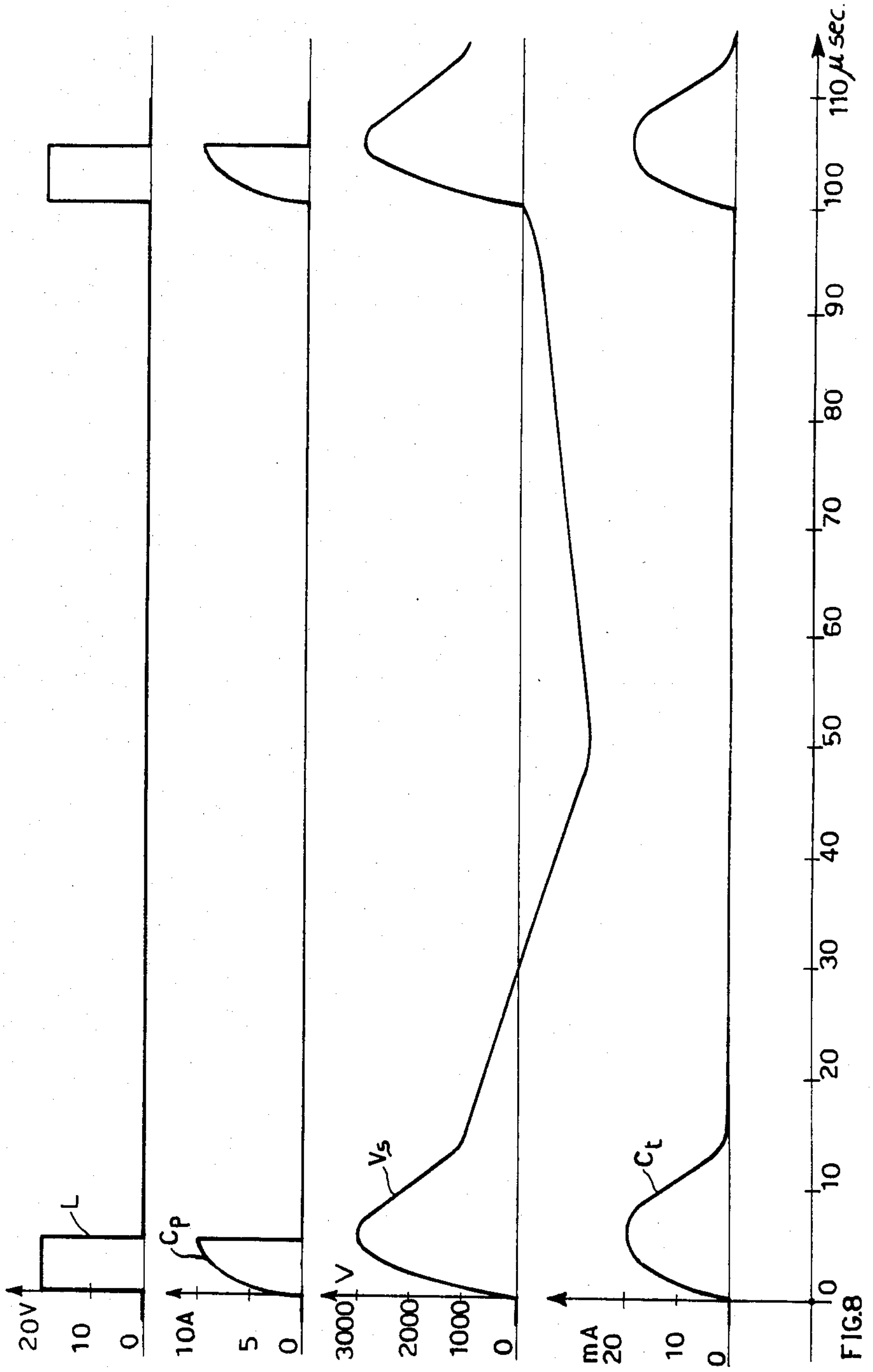
FIG. 8 is a diagram of waveforms occurring in operation of the circuit of FIG. 7.

According to a first embodiment of the circuit 41, shown in FIG. 7 and known as a direct control circuit, a diode 114 in series with a zener diode 116 are connected in parallel with the primary 104 of the transformer 103. Normally the transistor 112 is cut off, so that no current passes through the primary 104. Each time a logic signal is generated, represented by the waveform L of FIG. 8, for example a signal of 5 V for a time of about 5 μsec, the amplifier 111 (FIG. 7) makes the transistor 112 conducting for an equal time, so generating in the primary 104 a rapidly increasing current $C_p$ (FIG. 8) which ceases suddenly as soon as the logic signal L ceases. A voltage $V_s$ (FIG. 8) is then generated in the secondary 108 (FIG. 7) and thus between the electrodes 37 and 23 of the head 15, and this increases rapidly as long as the current $C_p$ lasts in the primary 104. Because of the above-described phenomena between the electrode 37 (FIG. 3) and the ink 20 in the nozzle 36, this voltage generates in the head 15 between the electrode 37 and electrode 23 a current $C_t$ (FIG. 8) which firstly increases as long as the control pulse lasts. The component values of the control circuit 41 are such that the voltage $V_s$ reaches about 3000 V, while the current $C_p$ reaches a value of about 10 A. When the current $C_p$ in the primary 104 ceases, the voltage $V_s$ decreases rapidly to a value of about 1000 V, whereas the current $C_p$ decreases to zero after about 15 μsec from the beginning of the logic signal. The first ink spray 48 is generated substantially at that moment, as seen with reference to FIGS. 5 and 6.

During the interval between the first spray 48 and the second spray 50 of ink 20, the voltage $V_s$ is the secondary 108 decreases more slowly, and because of its parasitic capacitance 109 and the magnetisation inductance inverts its polarity. The return to zero of the voltage $V_s$ in the secondary takes place after a delay which depends on the value of the negative voltage thus obtained. This voltage is limited by the setting of the diode 116 so as not to create negative effects on the rhythm of the meniscus 42. In the described example, the negative voltage reaches a value of about 1200 V and returns to zero after about 100 μsec, i.e. when the second spray 50 has completely ceased and the meniscus 42 has returned to rest. Thus in this case the printing control can be carried out with a maximum frequency of about 10,000 Hz, the limit of which is given substantially by the control circuit 41.

Figure 9:
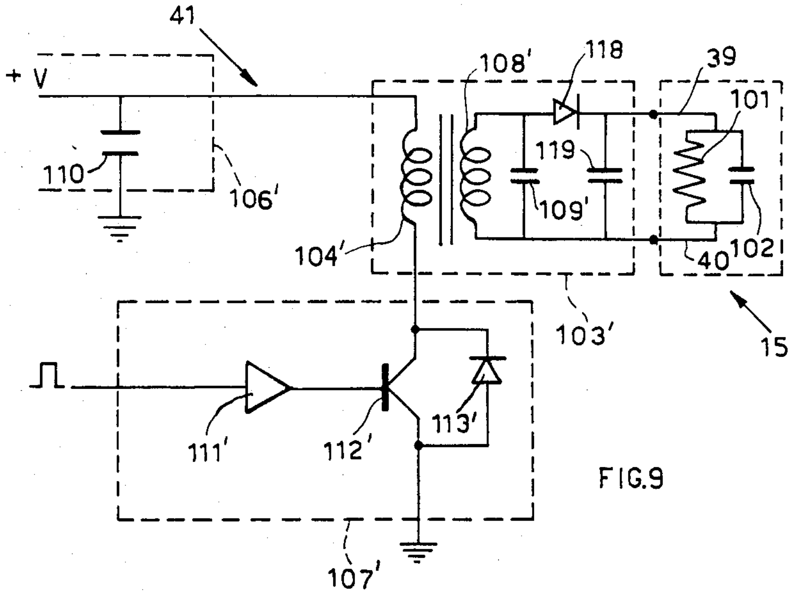
FIG. 9 is a circuit diagram of a second embodiment of the control circuit for the head.

FIG. 9 shows a further embodiment of the control circuit 41, in which those circuit elements analogous to those of FIG. 7 are represented by the same numeral plus a prime, and will therefore not be further described. This circuit, known as an indirect energy transfer circuit, makes use of a predetermined air gap in the magnetic circuit of the two windings 104' and 108', so that the transformer 103' behaves as an inductance.

In series with the secondary 108' there is now connected a diode 118, and in parallel with it but downstream of the diode 118 there is connected a capacitor 119 in addition to the parasitic capacitance 109'. In contrast, the diode 114 and the zener 116 of FIG. 7 are not present.

Figure 10:
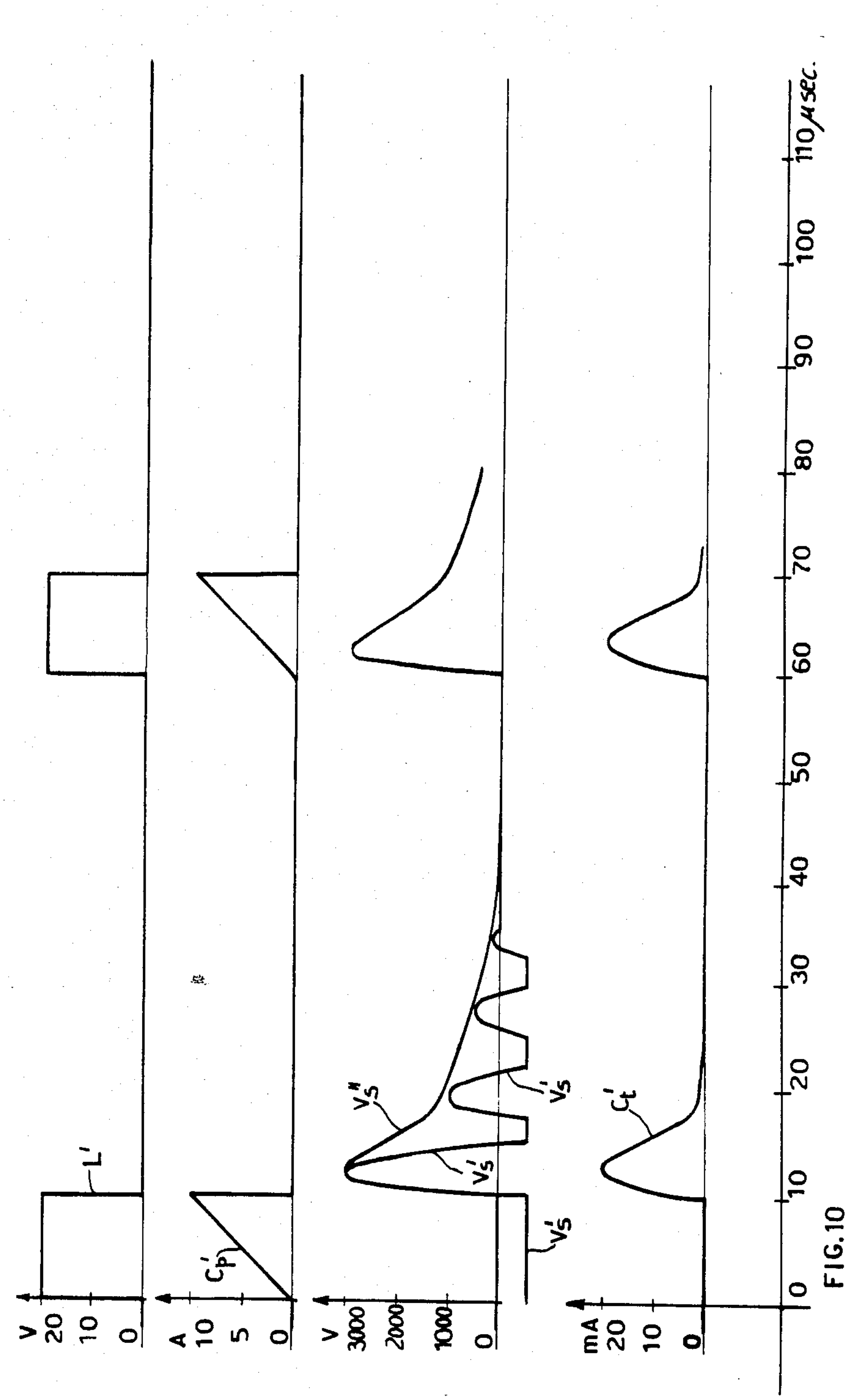
FIG. 10 is a diagram of waveforms occurring in operation of the circuit of FIG. 8.

In this case, when the logic signal L' amplified by the amplifier 111', (FIGS. 9 and 10) makes the transistor 112' conducting, a current $C_p'$ begins to pass in the primary 104' of the transformer 103' and increases linearly for as long as the logic signal L' lasts. In the secondary 108' of the transformer 103' there is then generated a predetermined negative voltage $V_s'$, for example 500 V, which because of the diode 118 has substantially no influence on the electrodes 37 and 23.

When the logic signal L' ceases, the current in the primary $C_p'$ also ceases suddenly. The voltage $V_s'$ in the secondary 108' upstream of the diode 118 then increases, firstly rising rapidly from −500 V to a maximum of about 3000 V, after which because of the capacitor 119 a series of damped oscillations of the voltage $V_s'$ takes place. It can be seen from this diagram that all the negative voltages are limited to a given value by the diode 113'.

In contrast, downstream of the diode 118 there is generated a resultant voltage $V_s'$ which during the logic signal L' is at zero, then coincides with the voltage $V_s'$ until its peak, then decreases rapidly over a certain portion. To obtain such a value of the maximum voltage, the circuit of FIG. 9 is operated with the duration of the logic signal L' double that of the case of FIGS. 7 and 8, while the current $C_p'$ reaches a value of about 10 A. Because of the phenomena in the nozzle 36, a current $C_t'$ now arises between the electrodes 37 and 23 of the head 15, and firstly increases together with the voltage $V_s''$, after which it decreases substantially at the moment in which the first ink spray 48 (FIGS. 5 and 6) arises from the nozzle 36. This occurs after about 8 μsec from the beginning of the passage of current between the electrodes 37 and 23 of the head 15.

A current has now ceased in the head 15, the voltage waves $V_s'$ downstream of the diode 118 in the secondary 108' are damped more slowly, and cease practically after about 40 μsec from the beginning of the logic signal. Likewise, downstream of the diode 118 the resultant voltage $V_s''$ decreases more slowly. The resultant voltage $V_s''$ can either be always greater than the crests of the voltage waves or less, and can either tend to zero or remain positive according to the size of the capacitance 119.

With the embodiment of FIG. 9, the cycle of the electrical circuit has a duration less than the time which it takes the meniscus 42 to return to rest. The next logic signal L' can be generated before the meniscus 42 returns to rest, for example after about 60 μsec from the first, so that the transistor 112' is cut off when the meniscus 42 reaches the exit aperture of the nozzle 36. Thus for the same nozzle 36 and ink 20, the frequency of the jet can be increases up to 15,000 Hz without superimposing the second energisation of the circuit 41 on the emergence of the dart 50 (FIG. 6_e_), thus considerably increasing the printing speed. This is particularly useful in the case of high definition printing, in which is required to be as continuous as possible and the dot diameter reduced to a minimum. It is worth considering the fact that the ink consumption of the printing device according to the invention is much less than that of analogous selective ink-jet printing devices of the piezoelectric type. It has been found experimentally that the mass of ink sprayed in order to print a dot of minimum diameter 150μ by means of a nozzle operating piezoelectrically is of the order of $0.3 \times 10^{-6}$ g, represented by a single droplet. In order to print a dot of the same diameter using the device of the invention, a mass of ink is sprayed of the order of $0.4 \times 10^{-7}$ g, represented by some tens of droplets, of which the diameter is therefore substantially less than the droplet obtained piezoelectrically. The thickness of the ink in the second case is on the average ⅛ that of the first case, so that is is apparent that the print dries more quickly. Complicated drying devices are therefore not required, and marks or smears do not arise even if the printed sheet is touched immediately after printing.

The importance of the immediate evacuation of the bubbles 49 (FIG. 4) for allowing restoration of the meniscus 42 should be noted. In this respect, if circulation of the ink 20 were suppressed, the bubbles 49 which are normally readily attracted by the bore 18 would remain in the zone of the nozzle 36 and clog it. The current of ions would strike the bubbles 49 instead of the liquid surface 42, and the sprays 48 and 50 would not be produced.

Various modifications can obviously be made to the decribed head 15 in terms of dimensions of the nozzle 36 and of the container 19 and the position of the electrodes. For example, the negative electrode 23 can be constituted by a second conductive layer prepared by silk-screen printing on the inner surface of the plate 31, with an appendix on the outside of the head for its electrical connection to the negative of the generator 41 or to earth. The polarity of the electrodes can also be reversed.

Moreover, the electrode 23 can reach substantially in line with the outer edge of the nozzle 36, as indicated by dashed lines and by the numeral 37′ in FIG. 3. In this case, the current between the electrode 37′ and ink 20 is mainly of resistive or electrolytic type. As the inner edge of the electrode 37′ is always rounded, the cross-section of the nozzle 36 of smallest diameter again lies in a position corresponding with the outer surface of the plate 31. The ink is again vaporised at this cross-section, and causes an agitation of the meniscus 42, so that after the first excitation of the electrode 37′, the two previously described sprays 48 and 50 are generated regularly. Finally, various nozzles 36 can be provided in a single head 15, in order to increase the printing speed.

Figure 11:
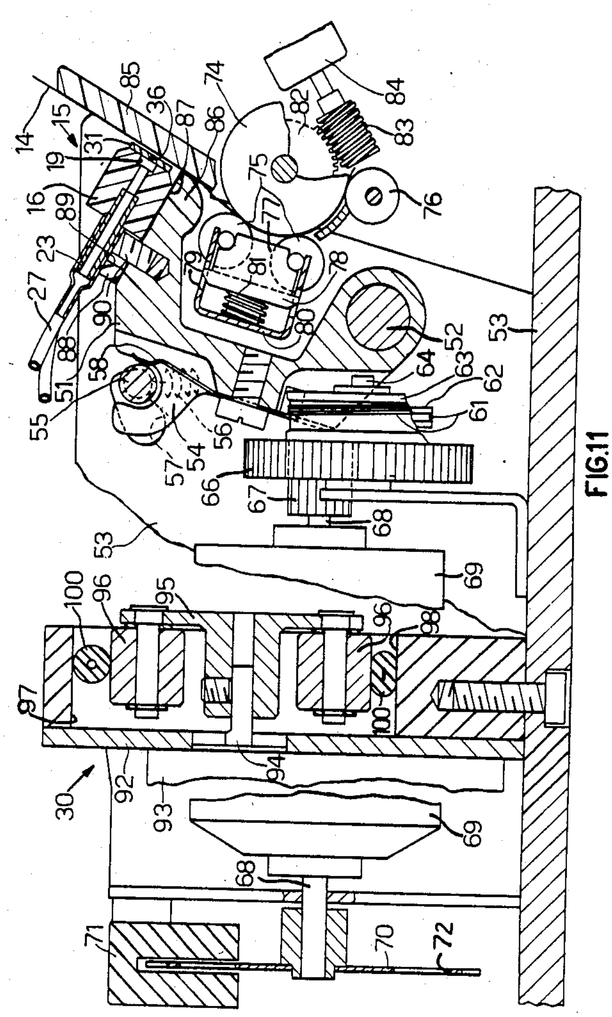
FIG. 11 is a longitudinal section through a printing device incorporating the printing head.
Figure 12:
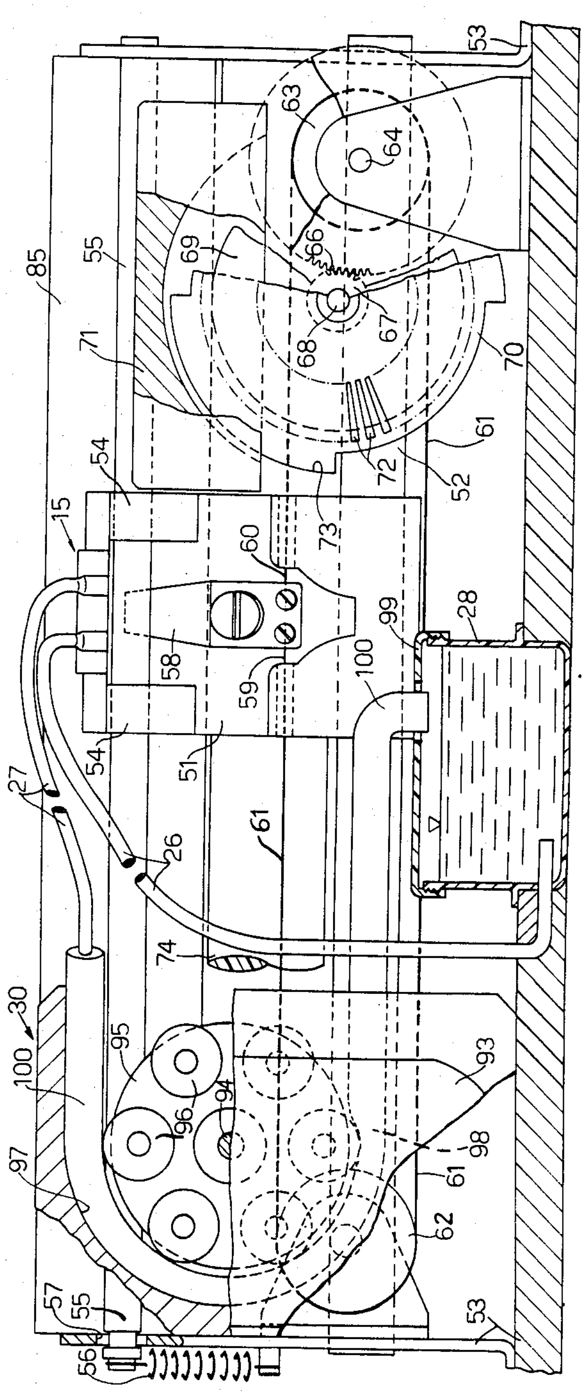
FIG. 12 is a front view of the printing device taken on the line XII—XII of FIG. 11.

A printing device using the head 15 heretofore described is illustrated in FIGS. 11 and 12. The device can be used in a typewriter, teleprinter, computer terminal or as a printer at the output of a data processing system or as a printer in a facsimile transmission system. In all cases, the characters are printed in dot matrices. As the head 15 comprises only a single nozzle 36, the head 15 is moved rapidly with reciprocating motion over the entire length of the print line, and the paper 14 is advanced vertically each time through a distance corresponding to the distance between two rows of the matrix.

The printing device is provided with a carriage 51 (FIG. 11) guided transversely on a bar 52 fixed to the fixed frame 53 of the printing device. The carriage 51 is also provided with two forks 54 (FIG. 12) which very slackly engage a transverse bar 55. The left hand end of the bar 55 is mounted on the corresponding side of the frame 53 in such a manner as to allow a certain movement of the left hand end of the bar 55. This latter end is connected to the relative side of the frame 53 by a spring 56, and can be moved from one to the other of two positions of a positioning slot 57 (FIG. 11) in the right hand side, in order to facilitate insertion of the paper 14. The carriage 51 also carries a leaf spring 58 which cooperates with the bar 55 in order to urge the carriage 51 elastically in a clockwise direction about the bar 52, as will be more apparent hereinafter.

The carriage 51 is connected to the two ends 59 and 60 (FIG. 12) of a flexible cable 61 which winds at one end about a guide pulley 62, and at the other end, by means of a few turns of the cable 61, about a drive pulley 63. This latter is fixed on a shaft 64, on which there is also fixed a gear wheel 66. This is constantly engaged with a pinion 67 fixed on to the shaft 68 of a reversible electric motor 69.

On the other end of the shaft 68 (FIG. 11) there is fixed a stroboscopic disc 70, which cooperates with a transducer 71 in order to indicate the transverse position of the head 15 at any time. For this purpose, the disc 70 comprises a set of slots 72 (FIG. 12) arranged to be read by the transducer 71. The transmission ratio between the motor 69 and carriage 51 is such that the pitch of the slots 72 corresponds to a transverse movement of the carriage 51 of 0.2 mm. The disc 70 is divided into four sectors, each of 90° and alternately defined by a portion 73 of greater diameter which is also arranged to be sensed by the transducer 71. Eight slots are disposed in each sector, so that the signal given at the beginning and end of each portion 73 constitutes the character initiation signal.

The paper sheet 14 (FIG. 11) is guided by a rotatable roller 74, with which there cooperate two sets of front paper pressing rollers 75 and one set of rear paper pressing rollers 76. The front rollers 75 are mounted rotatably in groups of four (two upper and two lower) on a block 77 having two lugs 78 guided in two corresponding slots 79 in a fixed transverse bar 80 of C cross-section. A compression spring 81 disposed between the bar 80 and each block 77 keeps the corresponding four rollers 75 resting against the roller 74. A helical gear wheel 82 is fixed on to the roller 74 and engages with a worm 83 fixed on the shaft of a stepping motor 84. The roller 74 is rotated at each reversal of the motion of the carriage 51 by the motor 84, worm 83 and helical gear wheel 82, so as to cause the paper to advance through 0.2 mm.

Above the roller 74, the paper 14 rests on a platen bar 85 which is slightly inclined in order to improve print visibility. The carriage 51 is provided with a nose which rests against the paper 14 on the bar 85 so that the nozzle spacing is independent of the thickness of the paper 14. The carriage 51 also comprises a surface 87 perpendicular to the support plane of the paper sheet 14 on the platen bar 85. The head 15 is removably fixed to the surface 87 of the carriage 51 so that the the plate 31 is at the required distance from the paper 14. For this purpose, the block 16 of the head 15 is provided with two brackets 88 (FIG. 2), each comprising a slot 89, and is removably fixed to the carraige 51 by means of two screws 90 (FIG. 11).

The carriage 51 (FIG. 11) is of a metal material, and is electrically connected to the conductor 40 (FIG. 2) of the tube 23 by way of a metal ring 91 fixed to the conductor 40 and mounted as a washer for one of the two screws 90, so that the negative electrode 23 of the head 15 is connected to earth. The conductor 30 (FIG. 1) connected to the positive electrode 37 is connected to the pulse generator 41, and is sufficiently long and flexible to enable the head 15 to move transversely.

On the fixed frame 53 is mounted the pump 30, which comprises a plate 92 on which a motor-reduction gear unit 93 is mounted. A disc 95 (FIG. 11) is fixed on the shaft 94 of the geared motor 93. Six rotatable rollers 96 are mounted on the disc 95 concentrically to the shaft 94, and on the plate 92 there is fixed a cylindrical cam 97 (FIG. 12) which is disposed eccentrically to the shaft 94 and has its minimum distance from the shaft 94 at the lower zone 98.

A tube 100 is inserted between the cam 97 and rollers 96, so that each time a roller 96 passes through the zone 97, a compression of the tube 100 is generated, so that the pump 30 is known as a peristaltic pump. The end of the tube 27 is inserted into one end of the tube 100. The tube 100 has substantially the same inner diameter as the tube 27, but a much greater thickness in order to resist the pumping effect of the rollers 96. It is therefore apparent that for each compression of the tube 100 there is a suction effect in the container 19 of the head 15. The disc 95 is rotated at a speed of sixteen revolutions per minute, so that the suction pulsations occur at a frequency of 96 per minute. The ink vessel 28 is disposed on the fixed frame 53 of the printing device, and can for example have a capacity of from 3 to 5 $cm^3$, this enabling from 300 to 500 pages of type to be printed. The vessel 28 has a screw cap 99 through which the end of the tube 100 passes sufficiently slackly to ensure that the ink leaving the pump 30 is at atmospheric pressure. The tube 100 terminates above the level of the ink, and the tube 26 connects the tube 23 of the head 15 to the vessel 28 below the level of the ink 29. The vessel 28 can be refilled by unscrewing the cap 99. Obviously, the tubes 26 and 27 are of sufficient length and flexibility to allow transverse movement of the head 15.

Alphanumerical characters are printed in accordance with a matrix of partially superimposed dots. The characters are generated by means of a character generator constituted by a decoder arranged to provide a set of signals representing the complete arrangement of the dots to be written, for each input character code. In order to print a line, the signals of the various characters are arranged in a buffer in known manner, so as to print both during the outward stroke and during the return stroke of the head.

Various modifications and improvements can be made to the described device. For example, the bar 85 can be dispensed with, and printing can be carried out directly on the platen. Moreover, the transverse movement of the carriage can be of variable extent according to printing requirements, and can be attained by different means, for example by means of an eccentric. Finally, the head 15 can be mounted with a different inclination or an inclination which is opposite to that indicated.

We claim:

1. Selective ink jet printing device, in which printing is carried out by inducing the selective emission of particles of an electrically conductive liquid ink through a nozzle from an insulating container (19), the ink being kept under such a pressure such as to form a concave meniscus (42) in the nozzle (36), and the printing of a dot being carried out by a voltage pulse between a first electrode (23) which is in contact with the ink in the container and a second electrode (37) which is disposed outside of nozzle, so as to create excitation of the meniscus and an electric current in the ink in the nozzle which cause the expulsion of a first spray constituted by a plurality of ink particles, said voltage pulse also generating a pressure wave in the ink, the nozzle (36) and container (19) being of such a shape and size as to reflect the pressure wave in such a manner as to cause, within a predetermined time, the expulsion of a second spray constituted by ink particles.

2. A device as claimed in claim 1, characterised in that the speed of the ink particles of the first spray is between 40 and 50 m/sec, while the speed of the ink particles of the second spray is between 60 and 100 m/sec.

3. A device as claimed in claim 1, characterised in that the time interval between the first and second sprays is between 60 and 80 $\mu$sec.

4. Selective ink jet dot printing device, in which printing of a dot is carried out by selectively inducing an emission of particles of an electrically conductive liquid ink through a nozzle from an ink container made of insulating material, said ink normally filling said nozzle and forming a concave meniscus in the nozzle, said nozzle having an exit diameter of between 20 to 100 micron and a length of at least six times said diameter, a first electrode in contact with the ink in the container and a second electrode disposed on the outer surface of said container adjacent the nozzle, and electrical means selectively operable to excite said electrodes to create a resistive electric current in the ink in the nozzle as to create an instantaneous vaporization of a portion of said ink adjacent said exit, thus causing the expulsion of ink particles from said nozzle.

5. A device according to claim 4, wherein said second electrode is formed of a ring having an inner edge of a diameter equal to the exit diameter of said nozzle, whereby said electric current assumes its maximum density inside the nozzle.

6. Selective ink-jet dot printing device, in which printing of a dot is carried out by selectively inducing an emission of particles of an electrically conductive liquid ink through a nozzle from an insulting container, wherein the ink is kept under such a pressure such as to form a concave meniscus in the nozzle, said nozzle having an exit diameter of between 20 to 100 micron and a length of at least six times said diameter and the printing of a dot is carried out by a voltage pulse between a first electrode which is in contact with the ink in the container and a second electrode which is disposed outside the nozzle, so as to create excitation of the meniscus and an electric current in the ink in the nozzle such as to create an instantaneous vaporization of a part of ink adjacent said exit, which cause the expulsion of ink particles.

7. An ink jet dot printing device, in which printing of a dot is carried out by selectively inducing an emission of particles of an electrically conducting liquid ink through a nozzel, comprising an ink container made of insulating material, said nozzel being substantially conical and being provided on said container, said nozzel having a smallest diameter of between 20 to 100 micron and a length of at least six times said diameter, said ink being kept under such a pressure in said container as to form a concave meniscus on the exit of said nozzel, a first electrode in contact with the ink in said container, a second electrode on the outer surface of said container adjacent the exit of said nozzle, and a pulse generator selectively generating a voltage pulse between said electrodes to create an excitation of the meniscus and an electric current in the ink of said nozzle, the density of said current in the portion of said nozzle having said smallest diameter being such as to create an instantaneous vaporization of part of said ink to cause the expulsion of ink particles from the nozzle.

8. A device as claimed in claim 7, wherein said second electrode is constituted by a ring having an inner edge of diameter not less than the exit diameter of the nozzle, and an inner surface substantially greater than the section through the nozzle in correspondence with said smallest diameter.

9. A device as claimed in claim 8, characterised in that the nozzle is formed through a plate and the second electrode is formed from a deposit of conductive material on the plate made by silk-screen printing with the thick film method.

10. A device as claimed in claim 8, characterised in that the said ring has a thickness not exceeding 50 micron and an inner diameter lying between the diameter of the nozzle and 400 micron.

11. A device according to claim 7, wherein an electric current in the space between said second electrode and said meniscus is supplied by an ionic component and a resistive component through ink particles.

12. A device according to claim 7, wherein said pulse generator includes a transformer having a primary connected to an energy source, and a secondary connected to one of said electrodes, and a driver circuit controlled by a logic signal of a predetermined duration as to obtain in the nozzle a voltage pulse, the peak of which occurs substantially at the moment in which said expulsion is created.

13. A device according to claim 12, wherein said transformer and said duration are so commensurated as to obtain a peak of said pulse of about 3000 V and a duration of between 8 and 15 μsec.

14. A device according to claim 13, wherein said secondary is provided with a parasitic capacity and a magnetization inductance as to create after said voltage pulse at least one inverted pulse, and including control means for controlling the effect of said inverted pulse on said electrode as not to exceed the interval between two subsequent logic signals.

15. A device as claimed in claim 14, characterised in that the voltage pulse is generated by a direct control circuit in which the logic signal ceases substantially when the peak of the voltage pulse is attained.

16. A device according to claim 15 wherein said secondary and said signal are so commensurated as to produce a peak of said inverted pulse no more than 1200 V and wherein said control means comprise a Zener diode adapted to reduce the duration of said inverted pulse to not more than 100 μsec.

17. A device as claimed in claim 14, characterised in that the voltage pulse is generated by an indirect energy transfer circuit in which the logic signal is used to store the energy and to transfer it to the ink in the nozzle when the logic signal ceases.

18. A device according to claim 17, wherein said logic signal during said duration causes in said primary a current increasing linearly and in said secondary a predetermined negative voltage, said logic signal when ceasing causing said secondary to create said voltage pulse, and additional capacitor in parallel with said secondary causing said voltage pulse to be followed by a series of damped oscillations, said control means comprising a diode in series with said additional capacitor to prevent the negative voltages of said secondary to affect said electrode.

19. An ink jet dot printing device, in which printing of a dot is carried out by selectively inducing an emission of particles of an electrically conductive liquid ink through a nozzle from an ink container made of insulating material, said ink normally filling said nozzle and forming a concave meniscus in the nozzle, said nozzle being substantially conical and having a smallest diameter of between 20 to 100 micron and a length of at least six times said diameter, and first electrode in contact with ink in said container and a second electrode disposed on the outer surface of said container adjacent said nozzle, electrical means selectively operable to excite said electrodes as to create a resistive electric current in the ink in said nozzle, the density of which in the portion of said nozzle having said smallest diameter being such as to create an instantaneous vaporization of part of said ink, thus causing the expulsion of ink particles, said container having a wall perpendicular to said nozzle and having a distance from the entrance of said nozzle as to enhance the expulsing action of said vaporization.

20. A device as claimed in claim 19, wherein said container is connected by two conduits to an ink vessel of substantially greater capacity than that of the container, means being provided for inducing a continuous circulation of the ink between the container and vessel in order to eliminate any gas bubbles from the nozzle.

21. A device as claimed in claim 20, characterised in that the conduits emerge from the container at two positions disposed in the same horizontal plane and equidistant from the nozzle.

22. A device as claimed in claim 21, characterised in that the distance between the conduits is up to two orders of magnitude greater than the nozzle length.

23. A device according to claim 20, wherein at least one of said conduits has a metal portion electrically connected to earth, said metal portion forming said first electrode in contact with the ink.

24. A device according to claim 20, wherein said conduits are connected to a pair of flexible tubes, said means for inducing circulation including peristaltic pump having at least an element arranged to periodically compress one of said flexible tubes.

25. A device as claimed in claim 24, wherein said pump comprises a hollow cylindrical cam and a set of rollers mounted concentrically on a disc which is rotatable eccentrically to the cam, the tube being disposed between the cam and the rollers.

26. A device according to claim 24, wherein said container, said nozzle and said conduits are carried by a printing head, said flexible tubes being detachably connected to said conduits, comprising a transversely movable carriage, mounting means for removably and adjustably mounting said printing head on said carriage, said mounting means including a pair of slotted brackets integral with said printing head and a pair of fixing elements for engaging said slotted brackets and adjustably fixing said printing head on said carriage.

27. A device according to claim 26 wherein at least one of said conduits has a metal portion forming said first electrode in contact with the ink, said printing head being electrically insulated, and comprising a washer electrically connected to said metal portion and engaged by one of said fixing elements to connect said first electrode electrically to the head.

28. A device as claimed in claim 19, wherein said distance is of the same order of magnitude as the length of said nozzle, and the section through the container which is normal to the said nozzle having a length up to two orders of magnitude with respect to the said nozzle.

29. A device as claimed in claim 19, used in printing characters according to a dot matrix, wherein said container and said nozzle constitute a printing head mounted on a carriage transversely movable with reciprocating motion, whereas the paper advances lengthwise intermittently at each reversal of motion of the carriage, and comprising stroboscopic means including a disc rotatable concomitantly with said reciprocating motion in order to indicate the carriage position at any time, said disc being provided with a plurality of equidistanced slots, the distance of which corresponds to the distance of dots in said matrix, said disc having also an edge in the form of steps, each embracing a number of slots corresponding to the number of dots in one line of said matrix.

30. A device according to claim 19, wherein said container and said nozzle are carried by a printing head mounted on a transversely movable carriage, comprising a paper platen, an abutment for defining a distance from the exit of said nozzle in the direction of the symetrical axis of said nozzle comprising between 0.1 to 1 mm, and elastic means for urging said carriage as to cause said abutment to elastically abut against said paper platen.

31. A device as claimed in claim 30, wherein said paper platen is formed of a flat fixed bar and is also guided on a paper supporting roller parallel to the fixed bar, at least two sets of paper pressing rollers being supported, in pairs pertaining to different sets, by elements urged elastically towards the said paper supporting roller, a stepping motor being provided for rotating the said paper supporting roller intermittently.

32. A device as claimed in claim 30, wherein said abutment is carried by said carriage and the carriage is guided by two bars, one of which is cylindrical and guides the carriage rigidly although allowing rotation about the bar, the carriage being guided by the other bar slackly so as to enable a leaf spring included in said elastic means and fixed on said carriage to urge said other bar as to keep the abutment resting against the paper.

33. A device as claimed in claim 32, characterised in that the said other bar is movable manually in order to enable the carriage to be withdrawn from the paper support bar and to facilitate insertion of the paper.

34. A device as claimed in claim 33, characterised in that at least one end of said other bar cooperates elastically with a positioning element arranged to define for the carriage a normal printing position and an open position for paper insertion.

35. An ink jet dot printing device, in which printing of a dot is carried out by selectively inducing an emission of particles of an electrically conductive liquid ink through a nozzle from an ink container made of insulating material, said ink normally filling said nozzle and having a specific resistance of between 20 and 300 ohms.cm, a surface tension of between 40 and 65 dynes/cm and a viscosity of between 1 and 1.4 centistokes, a first electrode in contact with the ink in said container, a second electrode disposed on the other surface of said container adjacent said nozzle, and a pulse generator selectively operable to generate a voltage pulse to excite said electrodes as to create a resistive electric current in the ink in said nozzle, said nozzle having a substantially conical shape with a smallest diameter of between 20 and 100 micron, said pulse generator being so dimensioned as to generate such a pulse with such a peak as to create an instantaneous vaporization of part of said ink in correspondence of said smallest diameter, thus causing the expulsion of ink particles.

36. A device as claimed in claim 35, wherein the ink is constituted by an aqueous mixture of nigrosine, with the addition of a saline electrolyte in order to obtain the said specific resistance, and of a glycol in order to obtain the said viscosity.

37. A device as claimed in claim 36 wherein the ink comprises between 2.5 and 6% of a chloride or sulphate of lithium, magnesium or potassium, and between 1 and 10% of diethyl glycol.

* * * * *